United States Patent [19]

Evans et al.

[11] Patent Number: 4,977,644
[45] Date of Patent: Dec. 18, 1990

[54] FISH HOLDER

[76] Inventors: Andrew L. Evans, Box 647, Magalia, Calif. 95954; Paul A. Behr, 5556 Wilson Landing Rd., Chico, Calif. 95926

[21] Appl. No.: 316,303

[22] Filed: Feb. 27, 1989

[51] Int. Cl.$^5$ .............................................. A22C 25/00
[52] U.S. Cl. .................................... 452/195; 269/258; 452/132; 452/196
[58] Field of Search .................. 17/53, 56, 58, 65, 70; 269/86, 104, 140, 258

[56] References Cited

U.S. PATENT DOCUMENTS

| | | |
|---|---|---|
| 328,995 | 10/1885 | Andrews . |
| 867,182 | 9/1907 | Bahde . |
| 2,464,114 | 12/1945 | Bloecher . |
| 3,165,779 | 1/1965 | Teetor et al. ............................ 17/65 |
| 3,713,188 | 1/1973 | Holladay .................... 17/70 |
| 3,727,269 | 4/1973 | Snead ....................... 17/70 |
| 3,785,008 | 1/1974 | Parker ..................... 17/70 |
| 4,054,968 | 10/1977 | Statz ....................... 17/70 |
| 4,253,650 | 3/1981 | Kuzio ....................... 17/70 |
| 4,454,630 | 6/1984 | Shouldis .................. 17/70 |
| 4,704,769 | 11/1987 | Hanechak et al. ...................... 17/56 |

Primary Examiner—Willis Little

[57] ABSTRACT

A portable fish holder for convenient, safe cleaning and filleting of a fish. The invention is comprised of one rectangular base panel, two panel support walls, one affixed transversely at each end of the base, and two positionable rectangular fish support panels. Both fish support panels have outwardly extending hinge pins at each end which are movably held in specifically structured grooves in the inward facing surface of each of the panel support walls. The shape of the grooves allows variable positioning of both fish support panels. A locked V-shape arrangement of both fish support panels is useful for holding a fish in a supine position for cleaning. Both fish support panels are also positionable parallel to the surface of the base. A tail securing clamp is provided on the backside of one support panel for use in securing the fish while scaling and filleting. A knife holder is also provided on the side of one fish support panel. Both fish support panels fold onto one another creating a compact portable unit complete with carrying handle.

12 Claims, 4 Drawing Sheets

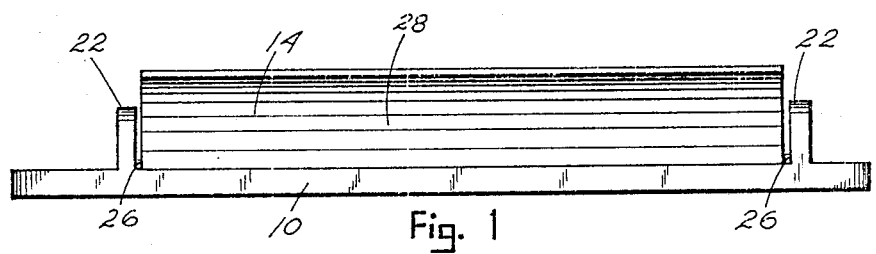
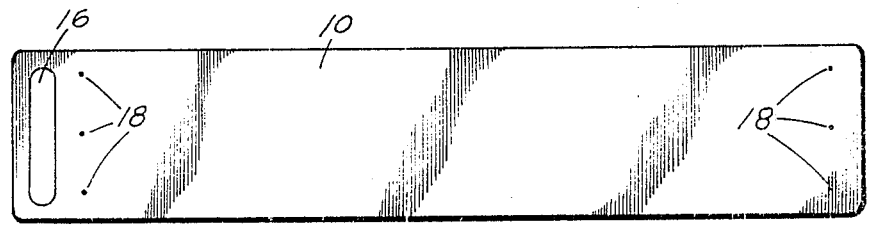
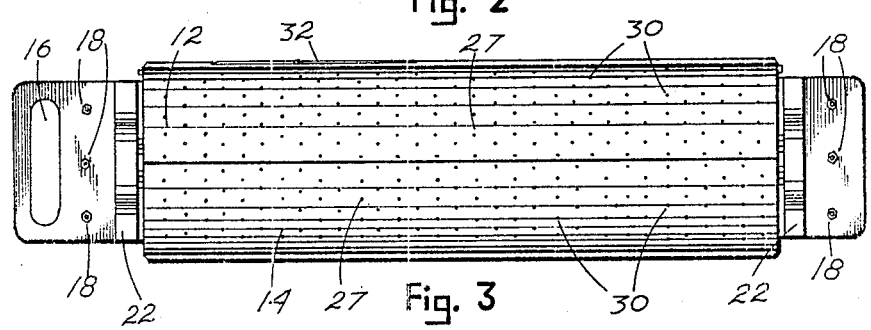

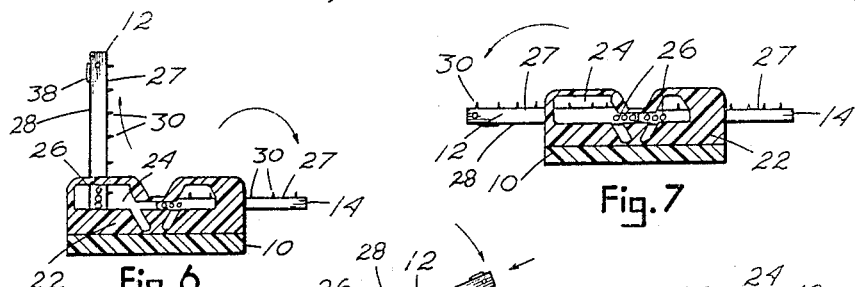
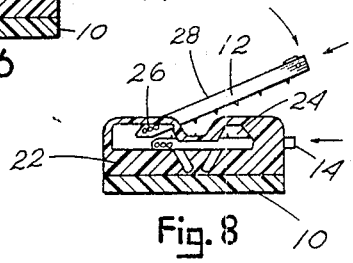
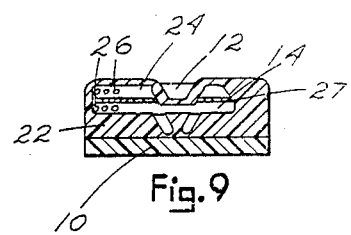
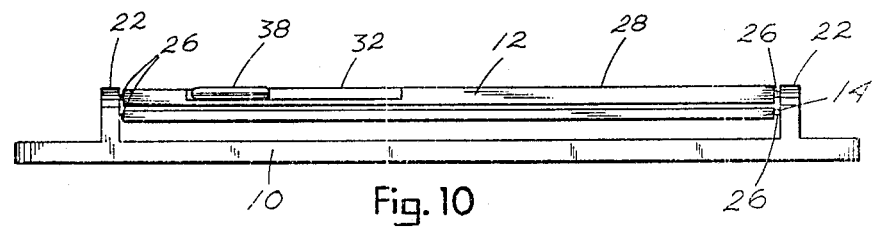
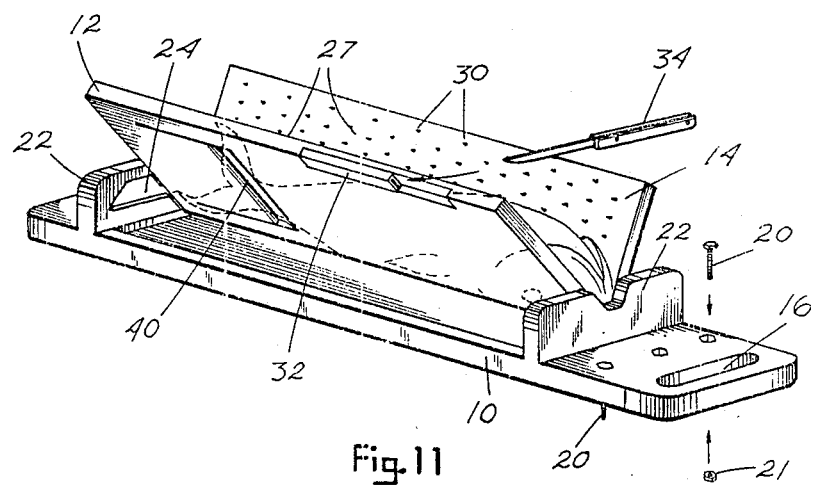

FISH HOLDER

BACKGROUND OF THE INVENTION

1. Field of the Invention

This invention relates to a portable, adjustable rack designed to hold a fish for convenient cleaning and filleting.

2. Description of the Prior Art

The awkward and sometimes hazardous process of cleaning and filleting fish has been well known to fisherman for many years. The naturally slick surface of fish make them difficult to hold for cleaning which poses a potential danger to the fisherman from injury with a knife. The job proves to be especially difficult when slicing the midsection of the fish for disemboweling. This cleaning procedure is best accomplished when the fish is supine, however without some kind of fish holder it is a difficult and dangerous position to maintain by hand while using a knife.

A past art patent search was conducted to examine portable fish cleaning devices which hold the fish supine for cleaning as well as on the side for filleting. Those devices which appeared most pertinent to our invention were found in the following U.S. classes and subclasses:

17/70, 55, and 169/54.5.

One past art device remotely suited for holding a fish supine was the device taught by Bloecher in patent number 2,464,114. This invention however is not designed as a fish cleaning device but as a holder for carving meat, and would require the user to support one side of the fish against the vertical wall to maintain a supine position.

Several of the past art inventions, such as the devices taught by Bahde in patent No. 867,812, Bloecher, Snead U.S. Pat. No. 3,727,269 and Shouldis U.S. Pat. No. 4,454,630, do not provide a knife and knife holder with their devices This is an inconvenience to the user who must remember to pack a separate knife when transporting the device or who must track one down each time the board is used. Although a cleaver is provided with the Bahde device for use in severing the heads and tails of the fish, a knife would still be required for disemboweling and filleting.

The Andrews and Bloecher devices also appear to be provided as non-portable stationary cleaning devices as they would be difficult to transport due to the exposed spikes.

Our invention overcomes the disadvantages of the past art devices and provides new and useful benefits which we feel are not offered by other related inventions

SUMMARY OF THE INVENTION

We have developed a portable fish holder which maintains the fish in a supine position for cleaning, and on the side or in a lateral position for filleting. The holder is basically comprised of a three piece plastic rack having a flat rectangular base with two short upwardly extending panel support walls and two adjustable rectangular fish support panels. Round, outwardly extending hinge pins located on the ends of the fish support panels are movably housed within specifically shaped grooves in the two panel support walls. With this attachment method, both fish support panels can be positioned parallel to the top surface of the base, or locked into a V-shaped formation. Spikes extending from one surface of the fish support panels help secure the fish from sliding when the panels are positioned in the V-shaped formation. A fish tail securing clamp is provided on the backside of one fish support panel to secure the fish for scaling and filleting when the panel is positioned parallel to the surface of the base with the backside up. A knife is also provided which is stored in a protective holding slot incorporated into the edge of one of the fish support panels.

Our fish holder is exceptionally well suited as a lightweight portable unit, having a carrying handle and being capable of folding into a compact form which encloses the knife blade and all spikes to prevent injury to the user.

Therefore, a primary object of our invention is to provide a fish cleaning holder which can secure a fish in a supine, lateral or prone position Another object of our invention is to provide a fish holder which provides an integral knife housing which protects the blade of a knife from damage and the user from injury.

A further object of our invention is to provide a fish holder which is both portable and has means for attachment to a stationary surface.

Further objects and advantages will subsequently become apparent with a reading of the following specification with reference to the accompanying numbered drawings.

DESCRIPTION OF THE DRAWINGS

FIG. 1 is a right side view of the fish holder.

FIG. 2 is a view thereof.

FIG. 3 is a top plan view of the fish holder with the fish support panels opened into the V-shaped formation.

FIG. 6 is a front end view with the panel support wall cross-sectioned showing the fish support panels in the process of being positioned side by side, parallel to the base panel.

FIG. 7 is a front end view with the panel support wall cross-sectioned showing the fish support panels cantilevered in a side by side position parallel to the base panel.

FIG. 8 is a front end view with the panel support wall cross-sectioned showing the fish support panels in the process of being folded for storage or transporting.

FIG. 9 is a front end view with the panel support wall cross-sectioned showing the fish support panels in the closed position with the tail clamp upward on the top panel for scaling and filleting the fish or for transport and storage of the entire device.

FIG. 10 is a side view of the fish holder in the closed or folded position. Also shown is the knife held in the knife holder on the side of the upper panel.

FIG. 11 is a perspective in-use illustration with a fish positioned supine and the knife withdrawn from the knife housing.

Figure 4:
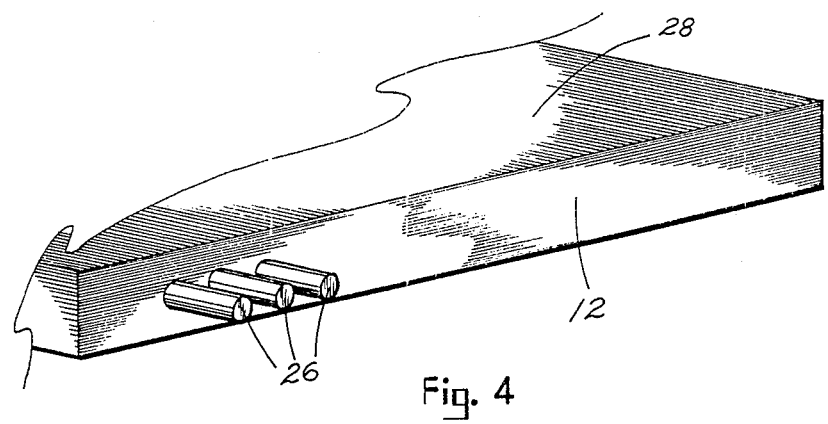
FIG. 4 is an enlarged perspective end view of one fish support showing the position of the hinge pins.

DRAWING REFERENCE NUMBERS 10 base panel
12 right fish support panel
14 left fish support panel
16 handle aperture
18 bolt apertures
20 hex head bolts
21 nut
22 panel support walls
23 elongated groove
24 retaining grooves
25 angled short grooves
26 hinging pins
27 interior surfaces
28 outside surface
30 spikes
32 knife housing
34 knife
36 blade
38 handle
40 tail securing clamp
42 slot
44 tail aperture
46 retractable top flap
48 fish
50 tail

DESCRIPTION OF THE PREFERRED EMBODIMENT

Referring now to the drawings where the invention is illustrated in many views. The fish holder is comprised of a flat rectangular base panel 10 and two positionable rectangular fish support panels designated right fish support panel 12 and left fish support panel 14. Base panel 10 is a substantially elongated rectangular panel having a front and back end, two lengthwise sides designated right and left, and a top and bottom surface All four corners of base panel 10 are rounded to avoid injury to the user. One elongated carrying handle aperture 16 is located on the front end of base 10. Adjacent handle aperture 16, extending downward through base panel 10, are a series of recessed bolt apertures 18. Bolt apertures 18 are each designed to retain one hex head bolt 20 used in combination with a nut 21 for securing the fish holder to a stationary surface if desired. A second series of bolt apertures 18 are also located on the back end of base panel 10 for the same purpose.

Two short rectangular panel support walls 22 are permanently affixed transversely onto the top surface of base panel 10 with one adjacent the front end and one adjacent the back end of the panel. Panel support walls 22 are set somewhat inward of the terminal ends of base panel 10 to allow space for both handle aperture 16 and bolt apertures 18 best seen in FIG. 1 and 11. The inward facing surface of each panel support wall 22 has a series of connected pin retaining grooves generally designated groves 24, shown in FIG. 11, and in cross section in FIG. 5 through 9. Retaining grooves 24 are designed to movably retain outwardly extending hinging pins 26 located on both ends of each support panels 12 and 14 shown best in FIG. 4.

Figure 5:
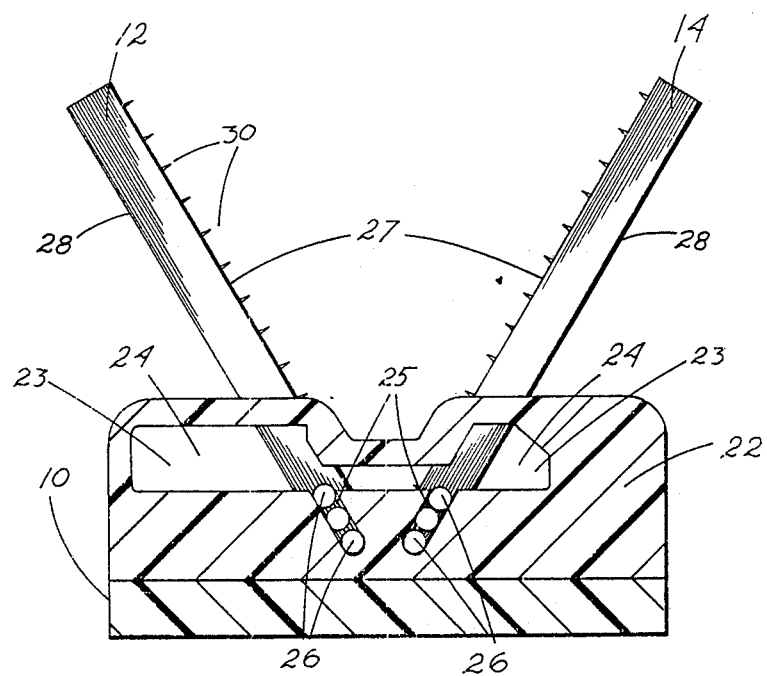
FIG. 5 enlarged front end view of the fish holder in the opened V-shape position showing the panel support wall in a cross-sectional view with the hinge pins housed in the specifically shaped grooves.
Figure 12:
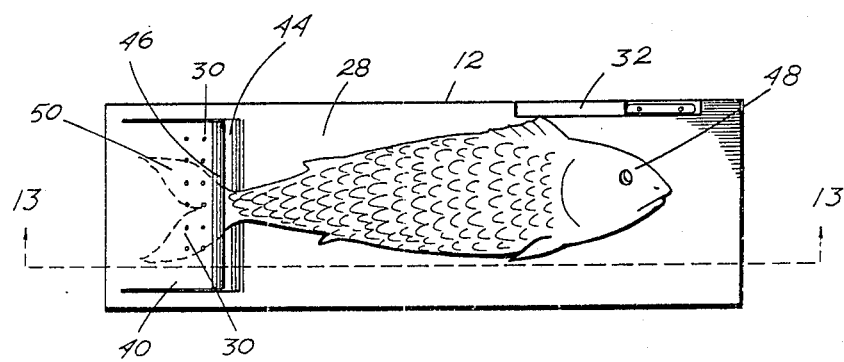
FIG. 12 is an in-use top plan view of the fish holder in the folded or closed position. Also shown is the tail clamp securing a fish in a position for scaling or filleting.

Pin retaining grooves 24 as shown in FIG. 5 are formed of one elongated groove 23 positioned longitudinally parallel to the top surface of base panel 10. The width of elongated groove 23 is reduced centrally to being slightly wider than the thickness of hinge pins 26 to allow cantilevering of fish support panels 12 and 14 into a side by side position parallel to base panel 10 as shown in FIG. 7. In the bottom of elongated groove 23 are two upwardly and outwardly angled short grooves 25 which hinge pins 26 can be positioned in, to removably lock the fish support panels into a V-angle as shown in FIG. 5 and 11. The widened areas on each side of the centrally reduced area of elongated groove 23 allow clearance for pins 26 to be installed and lifted out of short angled grooves 25. The widened areas also allow panels 12 and 14 to be positioned one on top of the other with the two interior surfaces 27 interfacing as shown in FIG. 9.

Hinging pins 26 as shown in the drawings are three dowels affixed at one side on both ends of each fish support panel extending in parallel alignment with the length of panels 12 and 14. Although three hinging pins 26 are described and shown in the drawings, two pins or even one rectangular pin could be used as long as the fairly long upper and lower surface which the three pins 26 provide is maintained to allow cantilevering and locking of support panels 12 and 14 as shown in FIG. 5 and 7. The use of three hinge pins 26 have been found to be an efficient arrangement or plastic injecting panel 12 and 14 with pins 26 attached, and will be understood by those skilled in the art.

Both fish support panels 12 and 14 are substantially rectangular elongated panels of about the same width as base panel 10 but sized shorter for insertion between panel support wall 22. Both fish support panels and 12 and 14 have two lengthwise sides, a front end, a back end, and an interior surface 27 and an exterior surface 28. Interior surfaces 27 of both fish support panels 12 and 14 are affixed with a plurality of short spikes 30 which prohibit the body of the fish from sliding when the fish support panel are locked in the V-angled position as shown in FIG. 11. Right fish support panel 12 can be maneuvered approximately one-hundred-eighty degrees, while left fish support panel 14 is functional within a range of about ninety degrees in retaining grooves 24.

Figure 13:
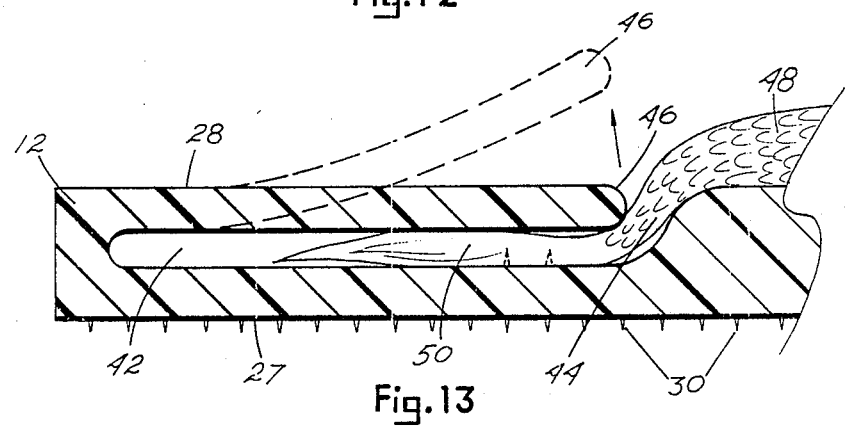
FIG. 13 is a sectional side view of the top panel showing the clamping feature of the device securing the tail of a fish as shown in FIG. 12.

Right fish support panel 12 is sized slightly thicker than left fish support panel 14 to accommodate a spring biased fish tail securing clamp 40. Tail clamp 40 consists of a rectangular transverse slot 42 centrally located between exterior surface 28 and interior surface 27. Slot 42 extends parallel to the length of support panel 12 and is positioned adjacent to the back end of support panel 12. Slot 42 does not extend through the outer lengthwise sides of right fish support pane 12 or through the back endward edge. A transverse vertical elongated opening, tail aperture 44, opens slot 42 through exterior surface 28. The area of exterior surface 28 which covers slot 42 is unattached on each lengthwise side and forms retractable top flap 46. Two rows of spikes 30 are affixed to the bottom surface of slot 42 to assist in securing the fish tail. The resilient nature of the material of manufacture and the inherent structure of the construction of base panel 10 and retractable top flap as shown in FIG. 13 is the method of spring biasing flap 46.

With the front end of base panel 10 facing the viewer, as seen in FIG. 5 with right fish support panel 12 on the left and left fish support panel 14 on the right, both fish support panels are positioned in the V-shaped or in-use position for holding a fish supine. This V-shaped position is especially useful for making a lengthwise incision on the inferior surface of fish 48 for removing the internal organs To fold the fish holder for storage and transporting, or to use right fish support panel 12 for filleting or scaling, right fish support panel 12 is rotated to fold on top of left fish support panel 14. At the same time, left panel 14 is positioned to the left with the right edge placed parallel to the lengthwise right side of base panel 10, shown in FIG. 8 in the process and completed in FIG. 9. Sufficient space is allowed for vertical positioning and one-hundred-eighty degree rotation of hinging pins 26 within retaining grooves 24 as shown in FIG. 6 and described above. In the folded or closed position, tail securing clamp 40 is positioned on top of the upper panel 12 positioned for use. Fish 48 can be positioned lengthwise along exterior surface 28 of right fish support panel 12 with the tail 50 adjacent to the back end of base panel 10, as seen in FIG. 10. Retractable top flap 46 is manually lifted widening tail aperture 44 sufficiently for insertion of tail 50, shown in FIG. 13. With tail 50 positioned over spikes 30 located on the floor of slot 42, retractable top flap 46 is released The memory in the material of manufacture returns retractable top flap 46 to the original horizontal position compressing tail 50 against spikes 30 and securing fish 48.

Figure 14:
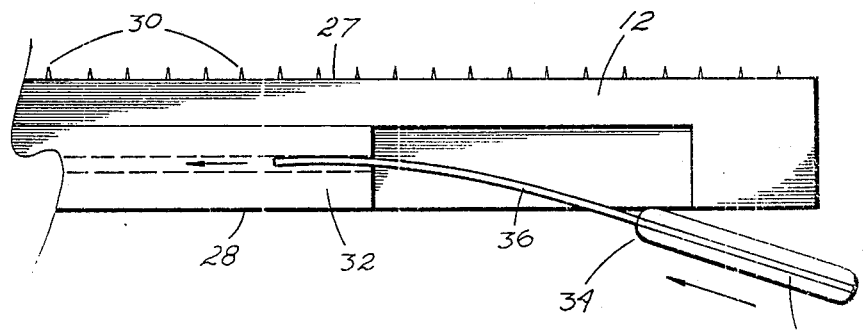
FIG. 14 is a side view of one fish support panel illustrating the knife in the process of being inserted into the knife housing.

The knife housing 32 is incorporated into the front outside left edge of right fish support panel 12 and is designed to removably retain knife 34. Knife housing 32 is an elongated rectangular recess formed into the edge of right fish support panel 12. Permanently affixed in one end of the elongated rectangular recess is a rectangular slotted housing of shorter length to close the edges of the housing. This method of forming the completed knife housing is particularly cost effective for plastic injection molding and will be understood by those skilled in the art. Flexible blade 36 of knife 34 is sized to be inserted into the slot with handle 38 resting within the remaining open recess of knife housing 32 as shown in FIG. 10, 11, and 14. When in the storage position, handle 38 of knife 34 is accessible while blade 36 is covered within the slotted portion of knife housing 32. To remove knife 34, handle 38 is pulled outward which slightly bends flexible blade 36. Handle 38 is then pulled forward removing blade 36 from the slotted housing. Although the flexibility of blade 36 allows insertion and removal of knife 34 from knife housing 32, there is sufficient rigidity in blade 36 to maintain knife 34 within knife housing 32 without falling out Knife 34 is a commercially available knife.

Although plastic has been suggested as the material of manufacture, wood or any suitable material may be used. However, when manufactured of plastic, panel support walls 22, and tail securing clamp 40 can be inherently molded into base panel 10, and hinging pins 26 can be molded integral to fish support panels 12 and 14.

Although we have described our invention in detail in the specifications it is to be understood that the description and drawings referred to therein are illustrative of the principles of this invention and are not to be interpreted in a limiting sense.

What we claim as our invention is:

1. A fish holder to allow convenient cleaning of a fish, comprising in combination;
    a base means having a front end, a back end, two narrow lengthwise sides and a top and bottom surface; said base means having two spaced support walls one affixed transversely to said top surface adjacent each said end to support,
    two fish support means each having a front end, a back end, narrow lengthwise side edges and an interior and an exterior surface;
    attachment means between said support walls and said fish support means, wherein at least one pin extending from each said end of each said fish support means is movably housed in grooves in the inward facing surfaces of said support walls with said attachment means including means for releasably locking both said fish support means in an upwardly and outwardly V-angled position, and means for positioning both said fish support means one on top of the other with said interior surfaces interfacing in parallel alignment with said top surface of said base means;
    means on said interior surface of at least one said fish support means to prohibit the body of said fish from sliding with said fish support means in said locked V-angled position.

2. The fish holder according to claim 1 wherein said base means further includes an elongated carrying handle aperture adjacent one said end.

3. The fish holder according to claim 1 wherein said base means further includes bolt apertures for securing said fish holder to a stationary surface.

4. The fish holder according to claim 1 wherein said means on said interior surface of at least one said fish support means to prohibit the body of said fish from sliding is a plurality of extending spikes.

5. A fish holder to allow convenient cleaning of a fish, comprising in combination;
    a base means having a front end, a back end, two narrow lengthwise Sides and a top and bottom surface; said base means having two spaced support walls one affixed transversely to said top surface adjacent each said end to support,
    two fish support means each having a front end, a back end, narrow lengthwise side edges and an interior and an exterior surface;
    attachment means between said support walls and said fish support means, wherein at least one pin extending from each said end of each said fish support means is movably housed in grooves in the inward facing surfaces of said support walls with said attachment means including means for releasably locking both said fish support means in an upwardly and outwardly V-angled position, and means for positioning both said fish support means one on top of the other with said interior surfaces interfacing in parallel alignment with said top surface of said base means;
    means on said interior surface of at least one said fish support means to prohibit the body of said fish from sliding with said fish support means in said locked V-angled position;
    a clamping means on said exterior surface of at least one said fish support means for securing the tail of said fish with said fish in a lateral position;
    a knife holding means for removably storing a knife 6. The fish holder according to claim 5 wherein said knife holding means is a slotted housing in at least one said side edge of said fish support means structured to retain said knife with the blade covered and the handle exposed.

7. The fish holder according to claim 5 wherein said base means further includes an elongated carrying handle aperture adjacent one said end.

8. The fish holder according to claim 5 wherein said means on said interior surface of at least one said fish support means to prohibit the body of said fish from sliding is a plurality of extending spikes.

9. The fish holder according to claim 5 wherein said base means further includes bolt apertures for securing said fish holder to a stationary surface.

10. A fish holder to allow convenient cleaning of a fish, comprising in combination;
- a rectangular base panel having a front end, a back end, two narrow lengthwise sides and a top and bottom surface;
- an elongated carrying handle aperture through said base panel adjacent one said end;
- a plurality of bolt apertures through said base panel for securing said fish holder to a stationary surface;
- two spaced support port walls one affixed transversely to said top surface adjacent each said end of said base panel to support,
- two rectangular fish support panels each having a front end, a back end, narrow lengthwise side edges and an interior and an exterior surface;
- attachment means between said support walls and said fish support panels, wherein at least one pin extending from each said end of each said fish support panel is movably retained in grooves in the inward facing surfaces of each said support wall with said attachment means including downward inwardly angled said grooves for releasably locking both said fish support panels in an upwardly and outwardly V-angled position, and an elongated said groove in substantially parallel alignment with said top surface of said base panel and in communication with said angled grooves for positioning both said fish support panels one on top of the other with said interior surfaces interfacing in parallel alignment with said top surface of said base panel;
- a plurality of spikes extending from said interior surface of at least one said fish support panel to prohibit the body of said fish from sliding;
- a spring biased clamp on said exterior surface of at least one said fish support panel for securing the tail of said fish with said fish in a lateral position;
- a knife housing in said side edge of at least one said fish support panel structured to removably retain said knife with the blade covered and the handle exposed 11. The fish holder according to claim 10 wherein said base panel, said support walls, and said fish support panels are manufactured of plastic.

12. The fish holder according to claim 10 wherein said spring biased clamp is an inherent part of said fish support panel.

* * * * *